(12) United States Patent
Ting

(10) Patent No.: US 7,628,625 B2
(45) Date of Patent: *Dec. 8, 2009

(54) CARD CONNECTOR

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/150,699

(22) Filed: Apr. 30, 2008

(65) Prior Publication Data

US 2008/0268683 A1  Oct. 30, 2008

(30) Foreign Application Priority Data

Apr. 30, 2007  (TW) .................... 96115267

(51) Int. Cl.
*H01R 13/62* (2006.01)

(52) U.S. Cl. ..................................... 439/159

(58) Field of Classification Search .............. 439/159, 439/607, 630, 541.5
See application file for complete search history.

(56) References Cited

U.S. PATENT DOCUMENTS

| | | | |
|---|---|---|---|
| 5,334,046 A * | 8/1994 | Brouillette et al. | 439/541.5 |
| 5,399,105 A * | 3/1995 | Kaufman et al. | 439/609 |
| 5,775,923 A * | 7/1998 | Tomioka | 439/79 |
| 5,954,522 A * | 9/1999 | Ho et al. | 439/79 |
| 5,993,259 A * | 11/1999 | Stokoe et al. | 439/608 |
| 6,174,197 B1 * | 1/2001 | Hirata et al. | 439/541.5 |
| 6,179,652 B1 * | 1/2001 | Tung et al. | 439/541.5 |
| 6,183,273 B1 * | 2/2001 | Yu et al. | 439/92 |
| 6,238,240 B1 * | 5/2001 | Yu | 439/541.5 |
| 6,398,567 B1 * | 6/2002 | Nishimura | 439/159 |
| 6,461,170 B1 * | 10/2002 | Oliphant et al. | 439/76.1 |
| 6,540,552 B1 * | 4/2003 | Kuo | 439/541.5 |
| 6,554,641 B1 * | 4/2003 | Wu | 439/541.5 |
| 6,572,392 B2 * | 6/2003 | Motojima | 439/159 |
| 6,655,973 B2 * | 12/2003 | Ji et al. | 439/159 |
| 6,736,671 B2 * | 5/2004 | Lee | 439/541.5 |
| 6,976,860 B1 * | 12/2005 | Su | 439/159 |
| 7,009,847 B1 * | 3/2006 | Wu et al. | 361/737 |
| 7,018,222 B2 * | 3/2006 | Chang | 439/159 |
| 7,018,234 B2 * | 3/2006 | Tanigawa et al. | 439/541.5 |

(Continued)

*Primary Examiner*—T C Patel
*Assistant Examiner*—Vladimir Imas
(74) *Attorney, Agent, or Firm*—Andrew C. Cheng; Wei Te Chung; Ming Chieh Chang

(57) ABSTRACT

A card connector (1) includes an insulating housing (30), a metal shell (11), a plurality of terminals (4) and an ejecting mechanism (6). The insulating housing includes a base section (31), a base seat (33) extending from one side of the base section, and a guiding portion (34) extending forwardly from the base seat. The metal shell is mounted on the insulating housing to define a card receiving space (14). The terminals are retained in the base section and protrude into the receiving space. The ejecting mechanism includes an ejecting member (64) protruding into the receiving space, a spring member (62) for moving the ejecting member towards an ejecting direction of the card, a heart groove (63) fitted on the ejecting member, and a latch member (61) for holding the ejecting member in position. The ejecting mechanism is mounted in a sliding groove (330) formed on the base seat, and the ejecting member is capable of sliding in the sliding groove.

16 Claims, 7 Drawing Sheet

U.S. PATENT DOCUMENTS

| | | | |
|---|---|---|---|
| 7,033,190 B1 * | 4/2006 | Chen | 439/159 |
| 7,052,316 B2 * | 5/2006 | Tanigawa et al. | 439/541.5 |
| 7,066,748 B2 * | 6/2006 | Bricaud et al. | 439/159 |
| 7,083,442 B2 * | 8/2006 | Muramatsu et al. | 439/156 |
| 7,101,222 B2 * | 9/2006 | Ho et al. | 439/541.5 |
| 7,232,320 B2 * | 6/2007 | Kuo | 439/159 |
| 7,309,245 B2 * | 12/2007 | Sadatoku et al. | 439/159 |
| 7,341,466 B1 * | 3/2008 | Kondo | 439/159 |
| 7,351,080 B2 * | 4/2008 | Hsiao | 439/159 |
| 7,367,827 B2 * | 5/2008 | Chen | 439/159 |
| 7,374,440 B2 * | 5/2008 | Chen et al. | 439/159 |
| 7,410,375 B2 * | 8/2008 | Van der Steen et al. | 439/159 |
| 7,413,453 B2 * | 8/2008 | Ting | 439/159 |
| 2006/0046567 A1 * | 3/2006 | Ho et al. | 439/607 |
| 2006/0128189 A1 | 6/2006 | Kuo et al. | |
| 2007/0004257 A1 * | 1/2007 | Hsu et al. | 439/159 |
| 2007/0093099 A1 * | 4/2007 | Kuo | 439/159 |
| 2007/0134959 A1 * | 6/2007 | Hsiao | 439/159 |
| 2007/0141878 A1 * | 6/2007 | Van der Steen et al. | 439/159 |
| 2007/0149017 A1 * | 6/2007 | Hsu et al. | 439/159 |
| 2007/0178733 A1 * | 8/2007 | Sadatoku | 439/159 |

* cited by examiner

CARD CONNECTOR

BACKGROUND OF THE INVENTION

1. Field of the Invention

The present invention relates to a card connector, and particularly to a card connector comprising an ejecting mechanism.

2. Description of Prior Arts

Memory cards are known in the art and contain intelligence in the form of a memory circuit or other electronic program. Some form of card reader reads the information or memory stored on the card. Memory cards are used in many applications in today's electronic society, including video cameras, music players, ATMs, cable television decoders, toys, games, PC adapters and other electronic applications. A typical memory card includes a contact or terminal array for connection through an electrical connector to a card reader system and then to external equipment. The connector readily accommodates insertion and removal of the card to provide quick access to the information and program on the card. The card connector includes terminals for yieldably engaging the contact or terminal array of the card. Additionally, the connector always has an ejecting mechanism for ejecting the insertion card out.

The prior art discloses a card connector having an insulating housing and a metal shell covering on the insulating housing. The metal shell is constructed as an L shape, and the insulating housing has a triangular plate to guide an L-shape card inserted. On one side of the card connector, an ejecting mechanism is mounted. The ejecting mechanism primarily includes a pushing bar allowing a user to operate, an ejecting bar for pushing a card, and a connecting bar connecting the pushing bar and the ejecting bar for transmitting a force between the pushing bar and the ejecting bar.

However, such card connector is mounted in an electronic equipment, and the connecting bar is fitted on the triangular plate. Therefore, overall height of the card connector is increased. Accordingly, more internal space of the electronic equipment is occupied.

In another prior art, a card connector has an L-shape shell defining a wider portion allowing a card to fit/eject and a narrower portion opposite to the wider portion, an insulating housing receiving a plurality of terminals, an arm portion located on a lateral side of the insulating housing, and an ejecting mechanism mounted on the arm portion. Although the overall height of the card connector is reduced, additional module of the arm portion for coupling with the ejecting mechanism makes a high cost for a producer and, moreover, an assembly process of the card connector becomes more inconvenient.

Therefore, the present invention is directed to solving these various problems by providing a card connector which reduces the overall size of the connector and achieves a lower cost connector.

SUMMARY OF THE INVENTION

An object, therefore, of the invention is to provide a card connector reduced a overall size and cost.

In the exemplary embodiment of the invention, A card connector includes an insulating housing, a metal shell, a plurality of terminals and an ejecting mechanism. The insulating housing includes a base section, a base seat extending from one side of the base section, and a guiding portion extending forwardly from the base seat. The metal shell is mounted on the insulating housing to define a card receiving space. The terminals are retained in the base section and protrude into the receiving space. The ejecting mechanism includes an ejecting member protruding into the receiving space, a spring member for moving the ejecting member towards an ejecting direction of the card, a heart groove fitted on the ejecting member, and a latch member for holding the ejecting member in position. Wherein the ejecting mechanism is mounted in a sliding groove formed on the base seat, and the ejecting member is capable of sliding in the sliding groove.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
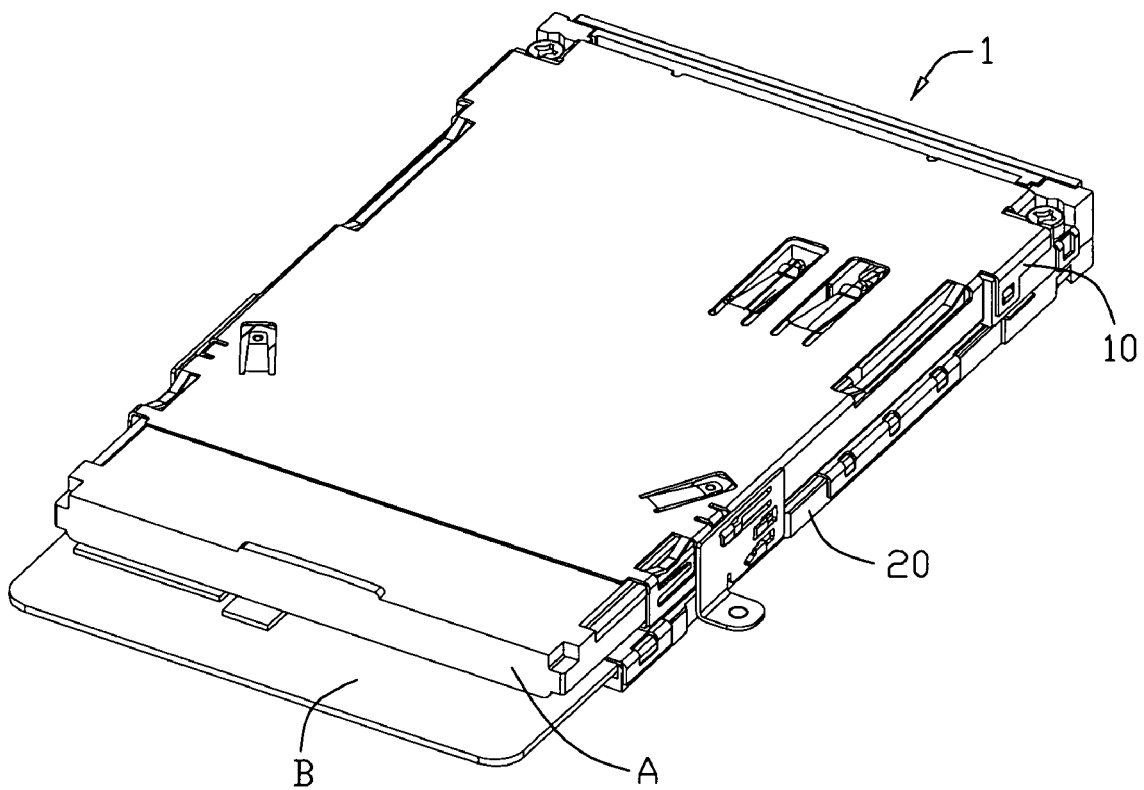
FIG. 1 is a perspective view of a card connector of present invention.

Referring to FIG. 1 to FIG. 7, the present invention provides a card connector 1 which is used for the connection with two cards having mutually different transmission speeds, such as an Express card, and a Smart card. The card connector 1 comprises a first connector 10 defining a first receiving space 14 for receiving a first card A, a second connector 20 stacked with the first connector 10 and defining a second receiving space 220 for receiving a second card B.

Figure 2:
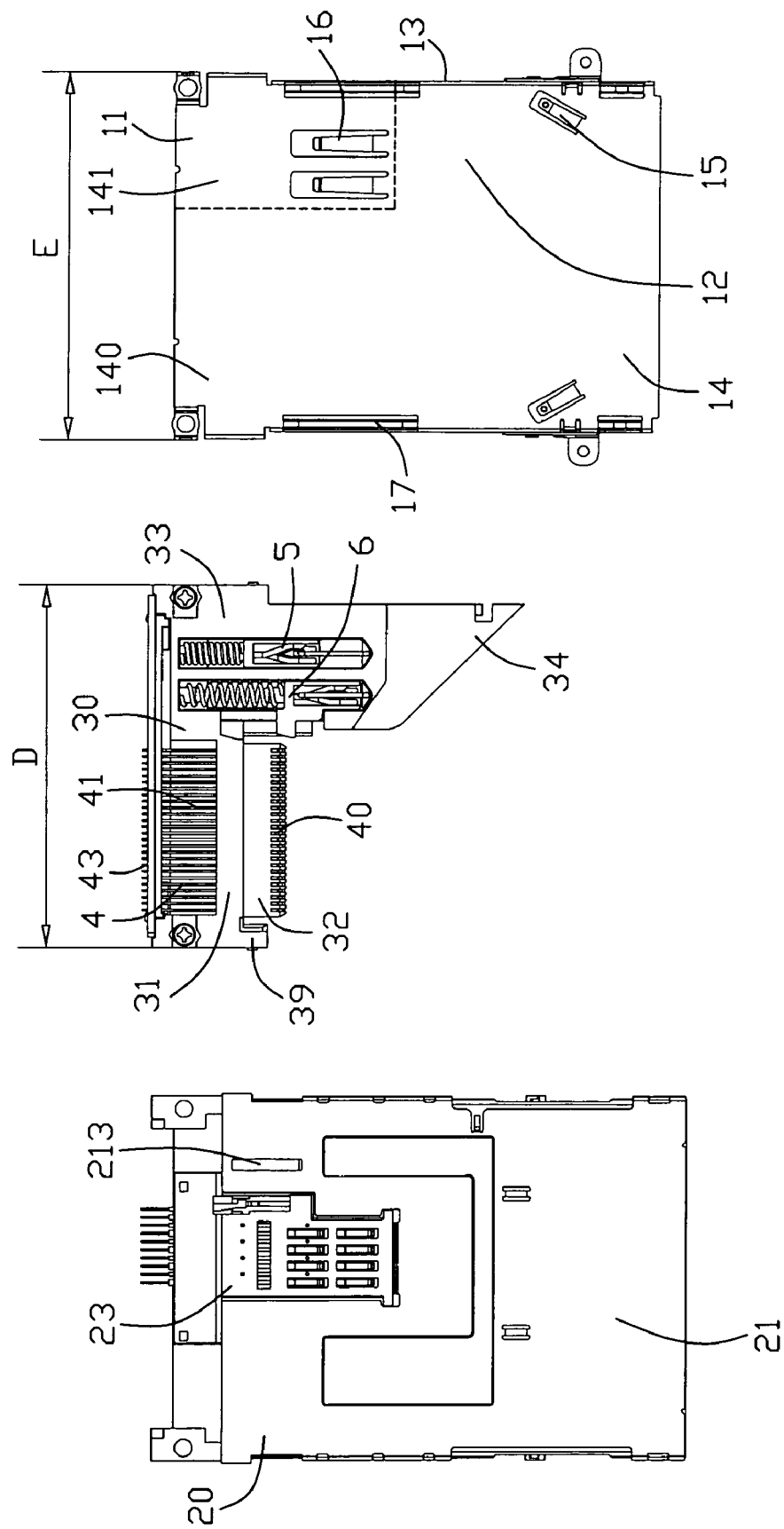
FIG. 2 is an exploded and top plan view of the card connector of present invention as shown in FIG. 1.

As shown in FIG. 1 and FIG. 2, the first connector 10 comprises a first metal shell 11, a first insulating housing 30 covered by the first shell 11, a plurality of first terminals 4 protruding into the first receiving space 14 to engage with the first card A, a first ejecting mechanism 6 and a second ejecting mechanism 5 for ejecting the first card A and the second card B, respectively.

The first shell 11, approximately a rectangular shape in a top plan view, and an U shape in a front view, comprises a first top wall 12, and a pair of first lateral walls 13 extending downwardly from the first top wall 12. The first receiving space 14 is defined by the first top wall 12 associating with the first lateral walls 13 and is divided into an L-shape card slot 140 to receive the first card A and a rectangular space 141, as shown in FIG. 2 surrounded by the broken line. When the first card A is received in the card slot 140, the rectangular space 141 is rightly left by a cut portion F of the first card A. The first top wall 12 has a pair of first elastic pieces 15, a pair of second elastic pieces 16, and a pair of first projecting portions 17. A sharp angle is defined between the elastic pieces 15 and an insertion direction of the card. The elastic pieces 15 are used for pressing on a metal part C (shown in FIG. 7) of the first card A serving as a grounding device and fastening device. The first projecting portions 17 are provided to guide the first card inserted stably. The second elastic pieces 16 extend along the insertion direction of the card.

Figure 3:
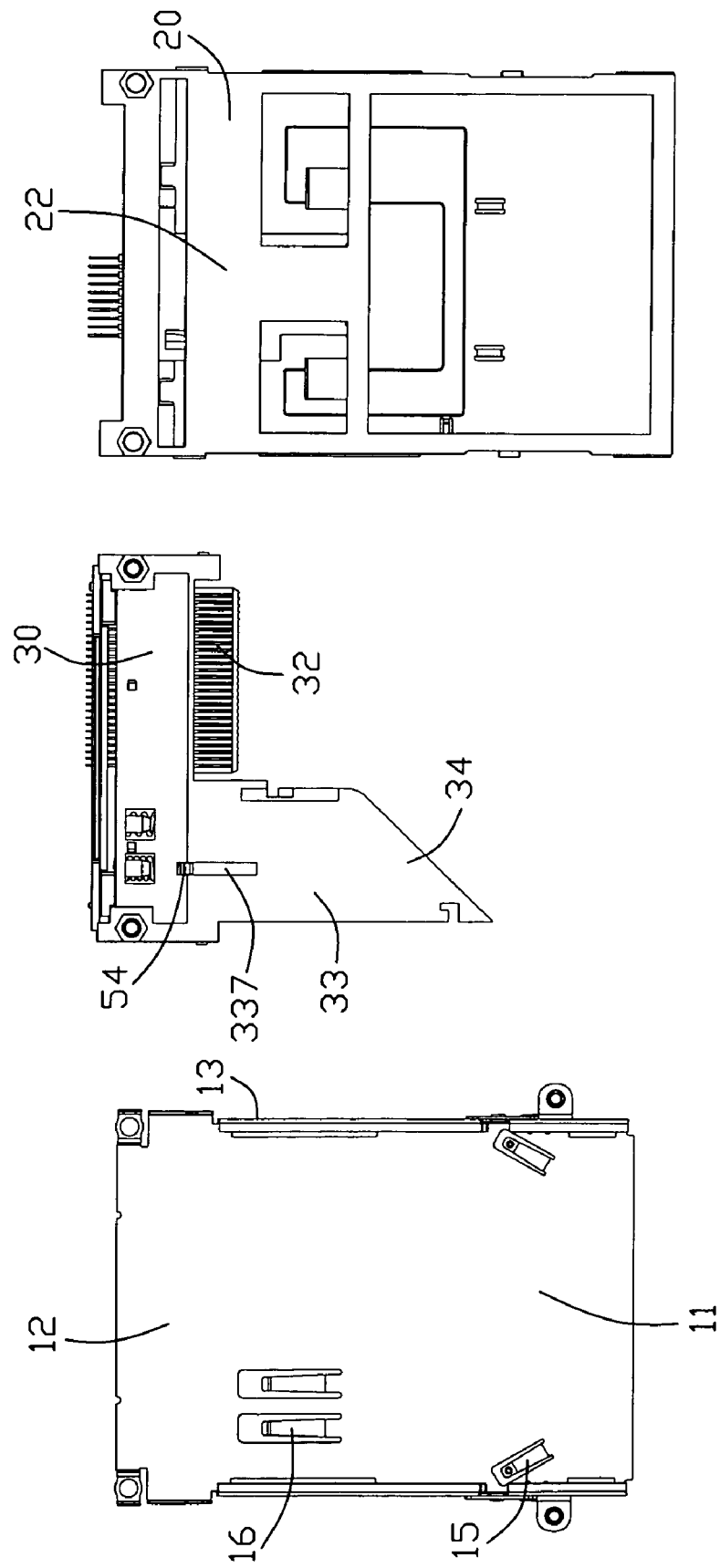
FIG. 3 is a bottom view of the card connector as shown in FIG. 2.
Figure 4:
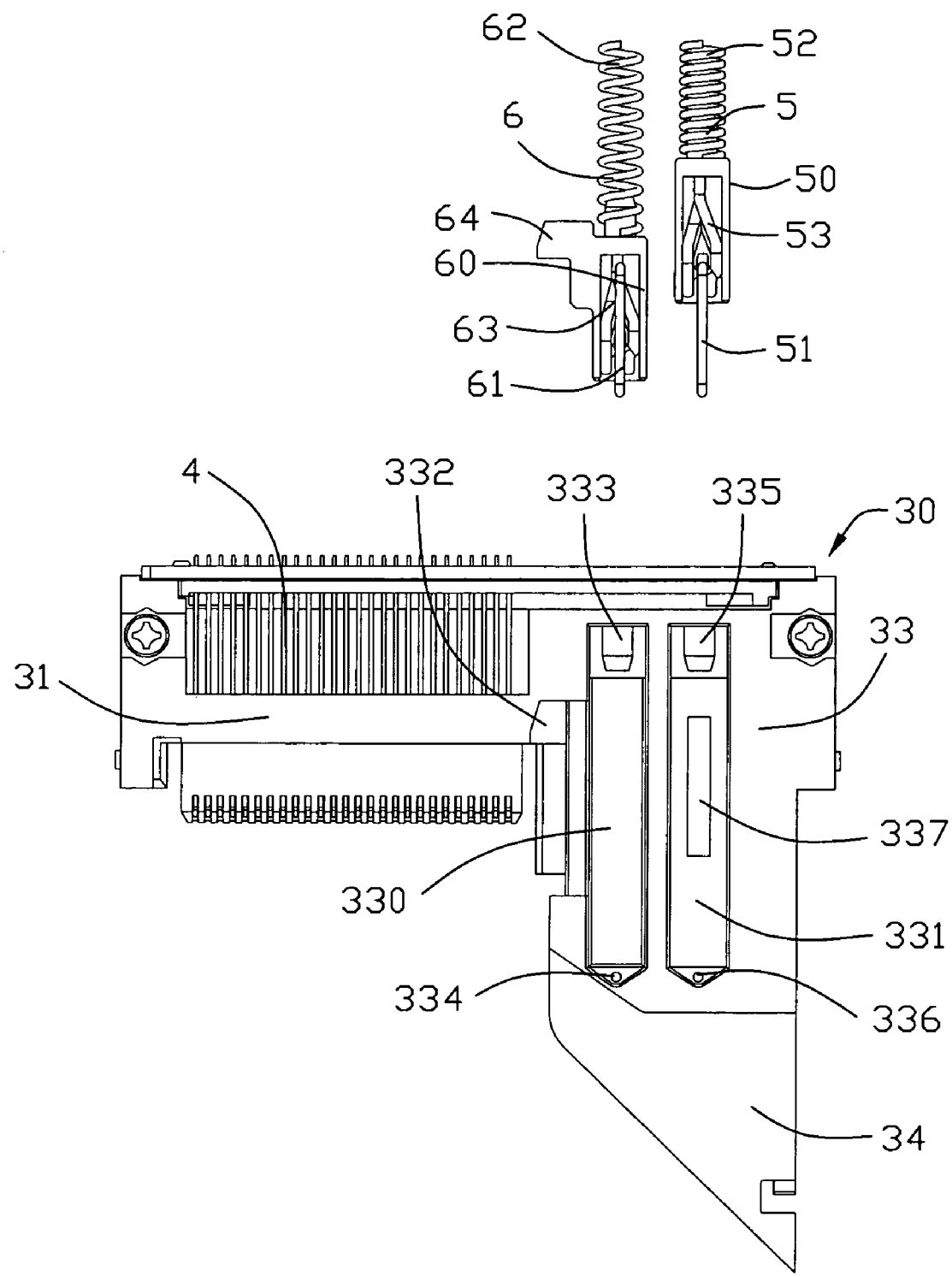
FIG. 4 is a top plan view of a first ejecting mechanism, a second ejecting mechanism and an insulating housing of the card connector according with present invention.

Referring to FIG. 2 to FIG. 4, the first insulating housing 30, structured as an L shape in a top plane view, comprises a base section 31, a base seat 33 extending laterally from the base section 31. Getting along a transverse direction perpendicular to the insertion direction of the card, a width D defined by the base section 31 associating with the base seat 33 is approximately equivalent to the width E of the metal shell 11. The base section 31 has a main portion (not labeled), an arm portion 39 at one end of the main portion, an engaging plate 32 extending from the main portion and perpendicular to the arm portion 39. In the engaging plate 32, a plurality of terminals 4 is received. Each terminal 4 comprises an engaging portion 40, a soldering portion 43 and a connecting portion 41 joining the engaging portion 40 with the soldering portion 43.

The base seat 33, designed approximately in a rectangular shape and longer than the base section 31 along the insertion direction of the card, has a first sliding groove 330 and a second sliding groove 331 perpendicular to the first sliding groove 330. The first sliding groove 330 and the second sliding groove 331, respectively, have a post 333, 335 at one end thereof, and a position hole 334, 336 opposite to corresponding post 333, 335. Particularly, the first sliding groove 330 and the second sliding groove 331 has a first sliding channel 332 and a second sliding channel 337, respectively. The first sliding channel 332 is formed at one edge of the first sliding groove 330, and the second sliding channel 337 is formed at the bottom of the second sliding groove 331 to communicating with the second receiving space 220. Moreover, in this embodiment of the present invention, the base section 31 has a triangular guiding portion 34 extending from the base seat 33 integrally to guide different card inserting. Therefore, the base section 31, the base seat 33, and the guiding portion 34 are integral.

As shown in FIG. 4, the first mechanism 6 and the second mechanism 5 are structured almost the same to each other and operated by an inserting card, and comprise, respectively, a first ejecting member 60, a second ejecting member 50 protruding into corresponding receiving space, a first spring member 62, a second spring member 52 for moving the ejecting member 60, 50 towards the card ejecting direction, a first heart groove 63, a second heart groove 53 and a first latch member 61, a second latch member 51 sliding in the heart groove 63, 53 to overcome the spring member 62, 52 and placing the ejecting member 60, 50 in a desirable position. The first ejecting member 60 and the second ejecting member 50, respectively, have a first pushing portion 64 extending laterally from one side of the first ejecting member 60, a second pushing portion 54 (shown in FIG. 6) extending downwardly from a bottom of the second ejecting member 50.

Figure 5:
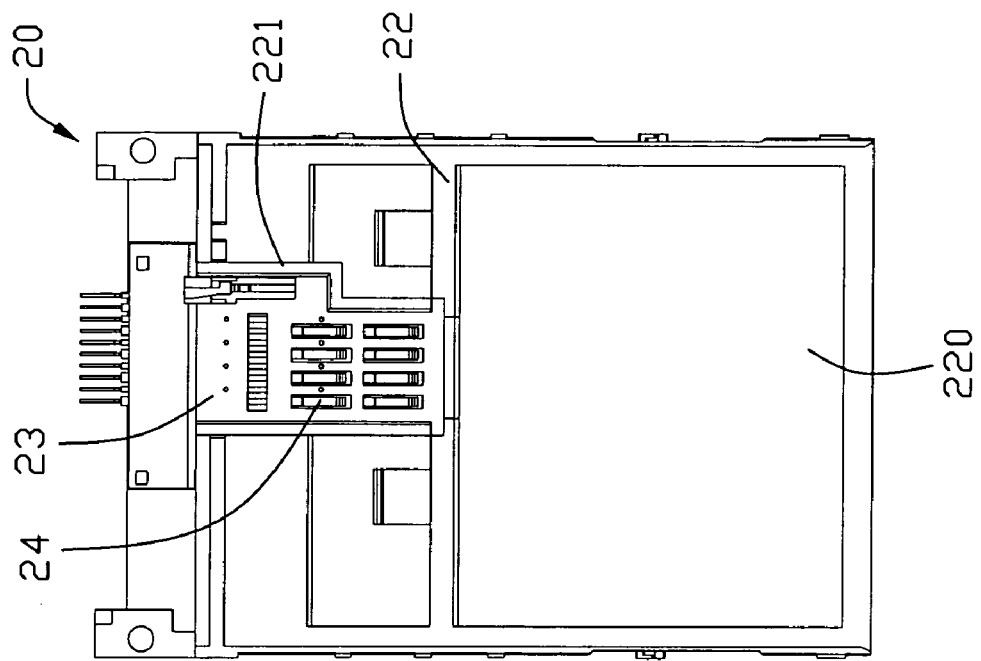
FIG. 5 is an exploded and top plan view of a second connector of the card connector according with present invention.
Figure 5:
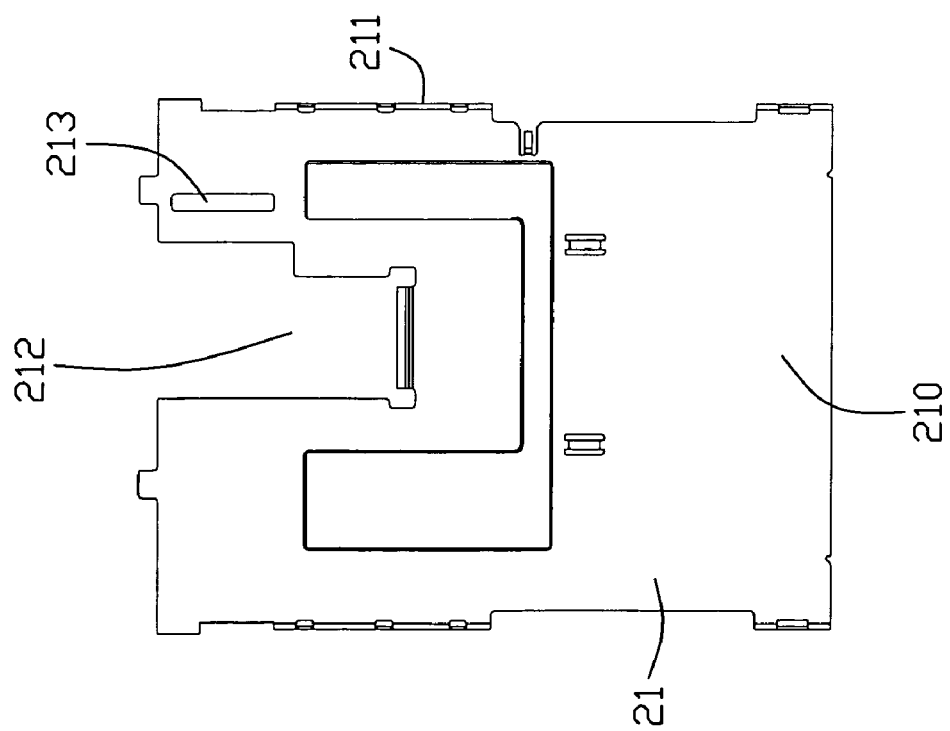

Together with FIG. 2, FIG. 3 and FIG. 5, the second connector 20 is placed under the first connector 10 respect to a printing circuit board (not shown) and comprises a second metal shell 21, a terminal module 23 aligned with the second shell 21, and a bottom plate 22 associating with the second shell 21 to define the second receiving space 220.

The second shell 21 is approximately rectangular shape, and comprises a second top wall 210, a pair of second side walls 211 extending downwardly from opposite sides of the top wall 210. The second top wall 210 has a fixing hole 212 in alignment with the terminal module 23, and a longitudinal groove 213 in accordance with the second sliding channel 337 of the second guiding groove 331.

The bottom plate 22 is constructed according with the second shell 21, and comprises a recess 221 to receiving the terminal module 23. In the terminal module 23, a plurality of second terminals 24 are retained and protrudes upwardly into the second card slot 220 to engage with the second card B electrically.

Figure 6:
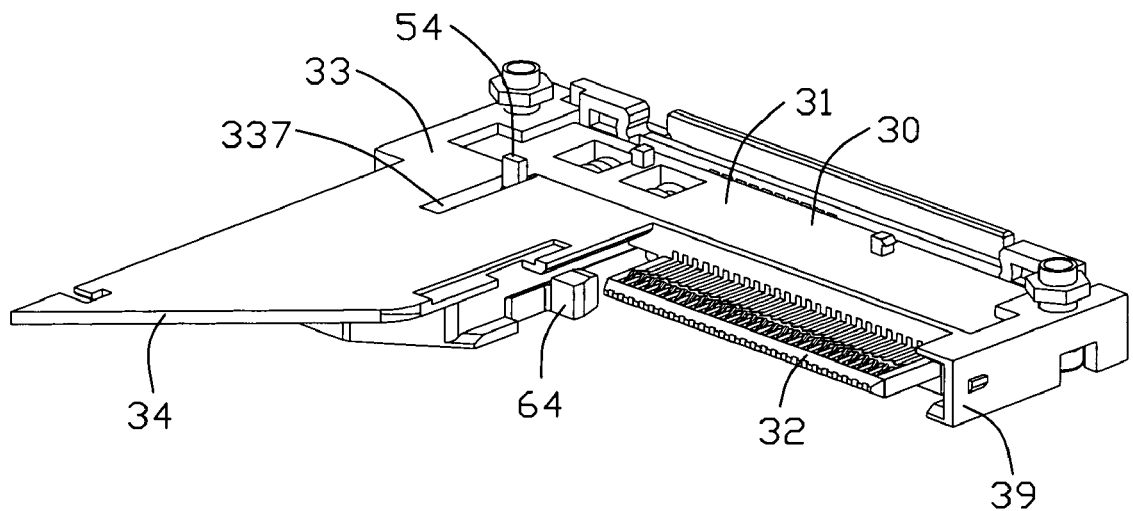
FIG. 6 is a perspective view of the insulating housing of the card connector.
Figure 7:
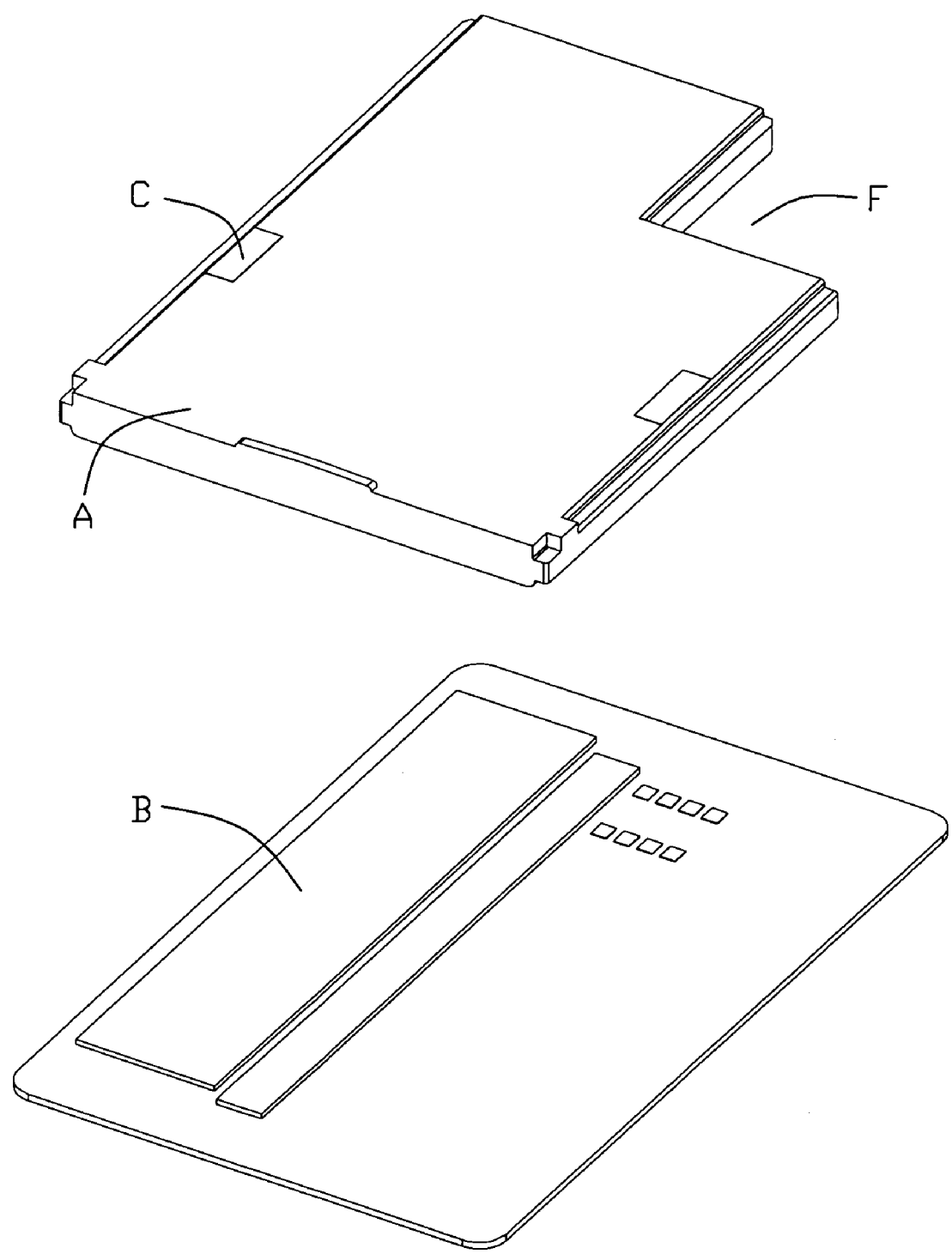
FIG. 7 is a perspective view of a first card and a second card allowed to be received in the card connector of present invention.

The relationship between the first ejecting mechanism 6, the second ejecting mechanism 5 and the first groove 330, the second groove 331 will be described in detail. The first ejecting mechanism 6 is mounted in the first groove 330 with the first pushing portion 64 protruding into the card slot 140, one end of the spring member 62 connecting the ejecting member 60 and the other aligned with the post 333, one end of the latch member 61 slipping in the heart groove 63 and the other end placed in the position hole 334. The second ejecting mechanism 5 is mounted in the second groove 331 in the same way as described of the first ejecting mechanism 6, except the second pushing portion 54 protruding downwardly into the second receiving space 220 by going through the second sliding channel 337 and the longitudinal groove 213 of the second metal shell 21, as shown in FIG. 2 and FIG. 6.

According with present invention, the first ejecting mechanism 6 and the second mechanism 5 are mounted in the first sliding groove 330 and the second sliding groove 331, more particularly, both the first sliding groove 330 and the second sliding groove 331 are formed on the base seat 33, and the base seat 33 is rightly fitted in the rectangular space 141. In such manner, it is needless to design another module to couple with the ejecting mechanisms. So a simple, convenient assembly process is achieved, accordingly, to save cost. On the other hand, the base seat 33 allows more ejecting mechanisms to be designed thereon, but do not take additional room as before. Besides, the first mechanism 6 and the second mechanism 5 are covered by the first shell 14 completely avoiding to being disposed out thereof and being interfered by other device.

In this embodiment of present invention, the card connector 1 is structured by vertically stacking two connectors that receive different cards. In another embodiment, a card connector is constructed by at least three connectors for receiving at least three cards, and one connector is designed as the first card connector 10 described above with at least two ejecting mechanisms mounted on a base seat 33 thereof, and the other two connectors are stacked vertically on opposite sides of said connector. The ejecting mechanisms protrude into corresponding card slot upwardly or downwardly to engaging with cards. Such structure also reduces overall size of the card connector, and save more space. In a third embodiment, a card connector comprises two card connectors arranged in a transverse direction or in a level, and two ejecting mechanisms are placed on a base seat formed between the two connectors, particularly, one of the connector should be designed with a card slot that has a L-space receiving space and a rectangular space, and the base seat is rightly received in the rectangular space to couple with ejecting mechanisms.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector for receiving electrical card, comprising:

an insulating housing comprising a base section, a base seat extending forwardly from a side of the base section, and a guiding portion extending forwardly from a distal end of the base seat;

a metal shell mounted on the insulating housing to define a card receiving space;

a plurality of terminals retained in the base section of the insulating housing and protruding into the receiving space for engagement with the card which is received in the receiving space; and an ejecting mechanism comprising an ejecting member protruding into the receiving space, a spring member having one end connecting with the ejecting member in an ejecting direction of the card, a heart groove disposed on a top surface of the ejecting member, and a latch member with one end movably received in the heart groove; wherein the base section, the base seat and the guiding portion are integral, the ejecting mechanism is mounted in a sliding groove formed on the base seat, and the ejecting member is capable of sliding in the sliding groove; wherein the metal shell comprises a top wall and a pair of lateral walls extending downwardly from opposite sides of the top wall, and an elastic niece is formed on the top wall and presses on the latch member.

2. The card connector as claimed in claim 1, wherein a width of the metal shell is approximately equal to that of the base section associated with the base seat along a transverse direction perpendicular to the ejecting direction of the card.

3. The card connector as claimed in claim 2, wherein the metal shell has a rectangular shape and covers the ejecting mechanism completely.

4. The card connector as claimed in claim 3, wherein the ejecting mechanism and the card are locked in a lock position during an insertion of the card and are released from the lock position by pushing the card in the lock position along the insertion direction.

5. The card connector as claimed in claim 1, wherein the guiding portion has a trapeziform shape and is completely received in the receiving space.

6. The card connector as claimed in claim 1, further comprising a second insulating housing assembled with the first insulating housing to define a second receiving space.

7. The card connector as claimed in claim 6, wherein the base seat further has a second sliding groove located side by side with the sliding groove, and a second ejecting mechanism is received in the second sliding groove and protrudes into the second receiving space.

8. The card connector as claimed in claim 7, wherein a second metal shell is sandwiched by the first insulating housing and the second insulating housing, and a terminal module is assembled with the second insulating housing.

9. The card connector as claimed in claim 1, wherein a pair of elastic pieces are formed on the metal shell adjacent to an opening of the shell, and the elastic pieces forms an angle along an insertion direction of the card when the card is inserted, the elastic pieces press on a metal portion of the card.

10. A card connector comprising:

a first insulating housing comprising a base section, and a trapeziform guiding portion extending forwardly from the base section, a plurality of first terminals retained in the base section;

a metal shell mounted on the insulating housing to define a first receiving space;

a second insulating housing mounted under the first insulating housing to define a second receiving space, a plurality of second terminals assembled with the second insulating housing and protruding into the second receiving space;

a first ejecting mechanism and a second ejecting mechanism equipped with the first insulating housing and partially protruding into the first receiving space and the second receiving space, respectively; wherein a bottom surface of the first insulating housing defines a channel trough which a pushing portion formed on one of the first and the second electing mechanism protruding into the second receiving ace.

11. A card connector assembly comprising:

stacked first and second connectors, said first connector including a first insulative housing with a plurality of first contacts therein and an L-shaped first card receiving space;

said second connector including a second insulative housing with a plurality of second contacts therein and a rectangular second card receiving space;

first and second ejection mechanisms are disposed by the first card receiving space under a condition that said first and second ejection mechanism is overlapped with said second card receiving space in a vertical direction, said first and said second ejection mechanisms defining first and second ejectors respectively protruding into the first and second card receiving spaces; and a metallic shell is essentially located between the first card receiving space and the second card receiving space to separate said first card receiving space and said second card receiving space; wherein both first and second ejection mechanisms are disposed in a base seat which is unitarily formed with the first housing.

12. The card connector assembly as claimed in claim 11, wherein the shell is dimensioned similar to the second card receiving space and larger than the first card receiving space.

13. The card connector assembly as claimed in claim 11, wherein said shell defines a groove so as to allow the second ejector to protrude into the second card receiving space.

14. The card connector as claimed in claim 10, wherein the first and second ejecting mechanism disposed adjacent to each other.

15. The card connector as claimed in claim 10, the first insulating housing further defines a base seat jointed the base section with the guiding portion and extending forwardly from a side edge of the base section, wherein the first and second ejecting mechanism dispose on the base seat.

16. The card connector as claimed in claim 10, wherein each of the first and second ejecting mechanism defines a pushing portion by which the first and second ejecting mechanism protruding into the first and second receiving space, respectively, wherein the two pushing portions of the first and second ejecting mechanisms are vertical to each other.

* * * * *